United States Patent [19]

Morikawa

[11] Patent Number: 5,505,970
[45] Date of Patent: Apr. 9, 1996

[54] METHOD AND APPARATUS FOR QUANTIFYING A DOUGH PRODUCT

[75] Inventor: Michio Morikawa, Utsunomiya, Japan

[73] Assignee: Rheon Automatic Machinery Co., Ltd., Tochigi, Japan

[21] Appl. No.: 353,101

[22] Filed: Dec. 9, 1994

[30] Foreign Application Priority Data

Dec. 9, 1993 [JP] Japan .................... 5-341464

[51] Int. Cl.⁶ .................... A21C 9/00; A21D 8/00
[52] U.S. Cl. .................... 426/231; 425/140; 425/141; 425/145; 425/373; 426/502; 426/517
[58] Field of Search .................... 426/231, 496, 426/502, 517; 425/140, 141, 145, 373, DIG. 108; 264/40.7

[56] References Cited

U.S. PATENT DOCUMENTS

| | | | |
|---|---|---|---|
| 4,877,632 | 10/1989 | Nogueroles | 426/502 |
| 4,902,524 | 2/1990 | Morikawa et al. | 426/502 |
| 4,904,491 | 2/1990 | Morikawa et al. | 426/502 |
| 5,079,014 | 1/1992 | Morikawa et al. | 426/231 |
| 5,106,636 | 4/1992 | Ban et al. | 426/231 |
| 5,118,274 | 6/1992 | Morikawa et al. | 425/140 |
| 5,209,939 | 5/1993 | Kempf | 426/231 |
| 5,266,341 | 11/1993 | Morikawa et al. | 426/231 |
| 5,314,322 | 5/1994 | Morikawa et al. | 425/142 |

*Primary Examiner*—George Yeung
*Attorney, Agent, or Firm*—Limbach & Limbach; W. Patrick Bengtsson

[57] ABSTRACT

A method and apparatus for delivering a constant amount of dough per unit time is disclosed. Successive dough blocks (5) are transferred on a first conveyor (8) at times proportional to their weights. The predetermined theoretical traveling distances of the dough blocks and the actual traveling distances of the dough blocks on the first conveyor are compared to find the change of the volume or specific gravity of the dough due to fermentation. Based on the comparison the traveling speed of the first conveyor is changed to obtain a uniform amount of the dough product, and the gap between a second conveyor (11) and a stretching roller (12) may be adjusted to increase the rate at which the dough is produced.

4 Claims, 2 Drawing Sheets

METHOD AND APPARATUS FOR QUANTIFYING A DOUGH PRODUCT

BACKGROUND OF THE INVENTION

1. Field of the Invention

This invention relates to a method and apparatus for quantifying the amount produced of dough for bread or confectionery, and in particular, to a method and conveying apparatus for discharging or feeding per unit time a constant amount of dough which is still under fermentation.

2. Description of Prior Art

U.S. Pat. Nos. 5,079,014 and 5,118,274 respectively teach a method and an apparatus for discharging or feeding a constant amount of dough per unit time. U.S. Pat. No. 5,079,014 discloses a method for automatically producing a sheet of dough used for the production of bread or confectionery wherein the manufacturing parameters, including the production speed, width, and thickness of the sheet of dough, are previously stored in a computer memory, so that a mass of dough supplied with a non-uniform width or thickness can be automatically stretched into a sheet of dough that satisfies the conditions stored in the computer memory.

The apparatus of U.S. Pat. No. 5,118,274 includes a dough-supplying conveyor and a constant-speed delivery conveyor positioned in series with and downstream of the supplying conveyor. The apparatus also includes a stretching roller which reciprocates, a dough-width measuring device, and means for changing the speed of the supplying conveyor in response to the signal produced by the dough-width measuring device. The stretching roller is disposed above the downstream end of the dough-supplying conveyor and the upstream end of the delivery conveyor. As a thick continuous dough sheet enters the space between the roller and the conveyors, it is stretched by the reciprocating roller. When the amount of the dough transferred by the supplying conveyor to the delivery one is greater than that discharged by the delivery one, the stretched dough becomes wider. The measuring device disposed near the roller detects the width of the wider stretched dough, and based on the detection the control means then lessens the speed of the supplying conveyor, so that the amount of the dough fed by the supply conveyor to the delivery conveyor equals the amount discharged by the delivery conveyor. Thus, in this apparatus a unit volume of dough is delivered per unit time.

However, if the dough is still under fermentation, the volume or specific gravity of the dough changes between the times when it is placed on the supply conveyor and when discharged from the delivery conveyor to a post-treatment station, such as a product-making or dough-cutting one. This may cause a drawback in that the products may differ from each other in weight. Further, there exists another drawback in that productivity will decrease as the speed of the supply conveyor is lowered.

SUMMARY OF THE INVENTION

The present invention is made in view of the above drawbacks and is an improvement of the invention disclosed in the two above-mentioned U.S. patents. The object of the invention is to provide a method of determining the quality of the dough in terms of fermentation or specific gravity, and to provide a method and apparatus for delivering dough at a constant weight per unit time.

The weights of dough blocks successively divided from a mass of dough for bread or confectionery, which is still trader fermentation, are respectively measured by known scaling means, as, for example, a scaling conveyor, and discharged therefrom to a dough-supply conveyor or first conveyor. The first conveyor transfers the dough blocks to a delivery conveyor or second conveyor. During the transfer on the first conveyor the leading ends of the dough blocks each are spaced apart at distances proportional to their weights. In other words, after a first dough block has been transferred on the first conveyor by a distance proportional to its weight the first conveyor receives a second one from the scaling means. The weight of the second dough block may be different from that of the first one. In the same manner the third one is transferred after the second one has been transferred by a distance proportional to its weight. This operation between the first conveyor and the scaling means is controlled in a known manner. The dough blocks from the scaling means are placed on the first conveyor so that they may be connected to each other and may become generally flattened into a continuous sheet on the first conveyor. A reciprocating roller is disposed to reciprocate above the first and second conveyors. The roller is spaced apart from the conveyors so that a space or gap is formed between the roller and the conveyors. The dough sheet enters the space under the stretching roller and is stretched into a sheet of a certain thickness that corresponds to the size of the space. In the invention the roller can be made movable to and away from the conveyors so that the size of the space can be adjusted to deliver a greater or lesser amount, i.e., a greater or lesser volume, to accommodate the change of volume caused by fermentation of the dough. As due to fermentation the volume of the dough is greater when it is at the roller than it was at the scaling means, the width of the dough stretched by the roller increases if the size of the gap above the conveyors is constant. In this case, as described in the U.S. patents, a width-sensor disposed near the roller detects the width of the dough stretched wider by the roller and transmits this information to the controller to slow the speed of the first conveyor. In the present invention, an actual traveling distance of the dough on the first conveyor and a predetermined theoretical traveling distance of the dough are compared. From these two traveling distances the change of the specific gravity of the dough is determined. Further, based on the determination the space below the roller may be widened to increase the quantity of the dough produced. Other features and advantages of the invention will be apparent from the following description made by referring to the accompanying drawings.

DESCRIPTION OF THE PREFERRED EMBODIMENTS

Figure 1:
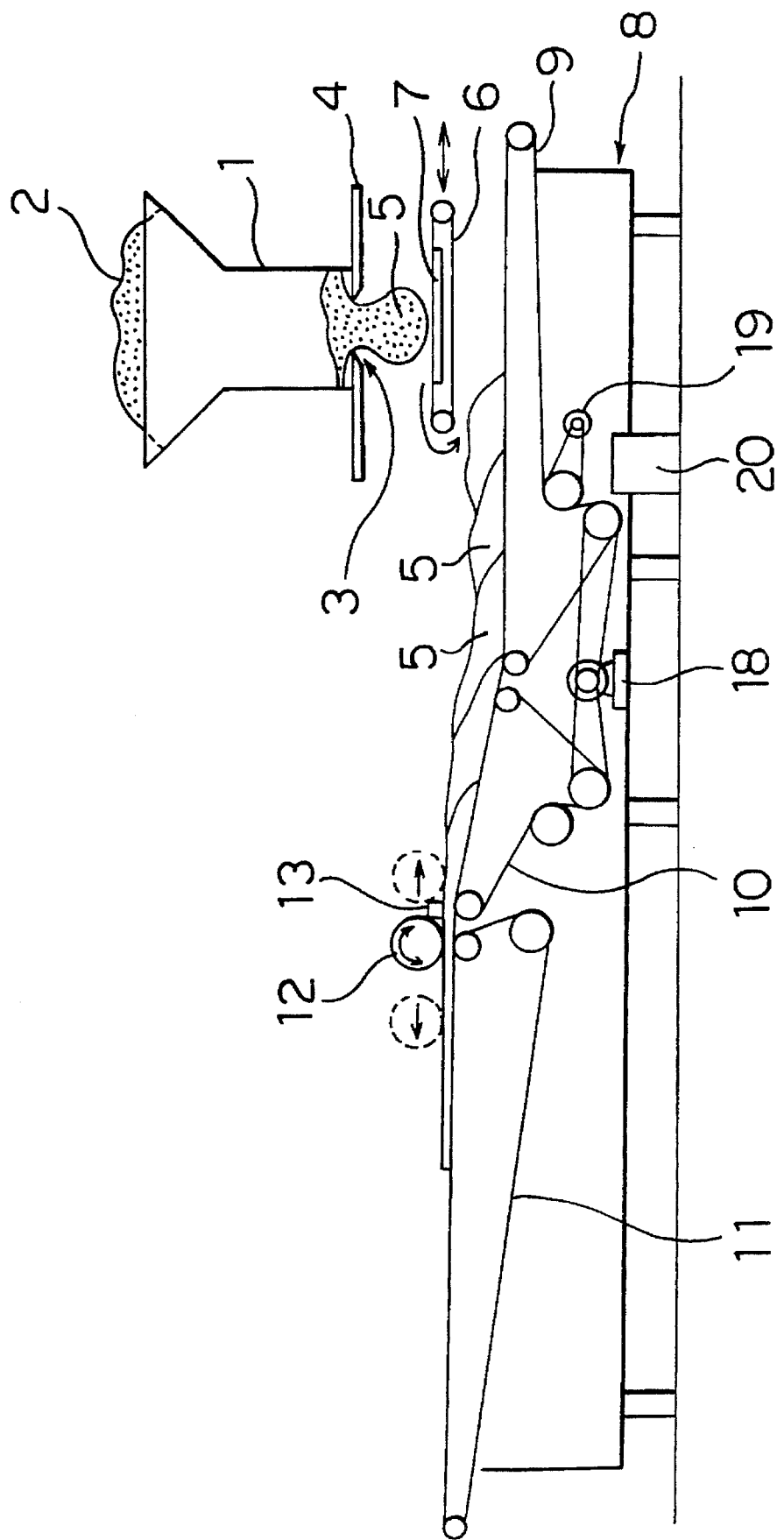
FIG. 1 is a schematic front view of an apparatus according to an embodiment of the present invention.
Figure 2:
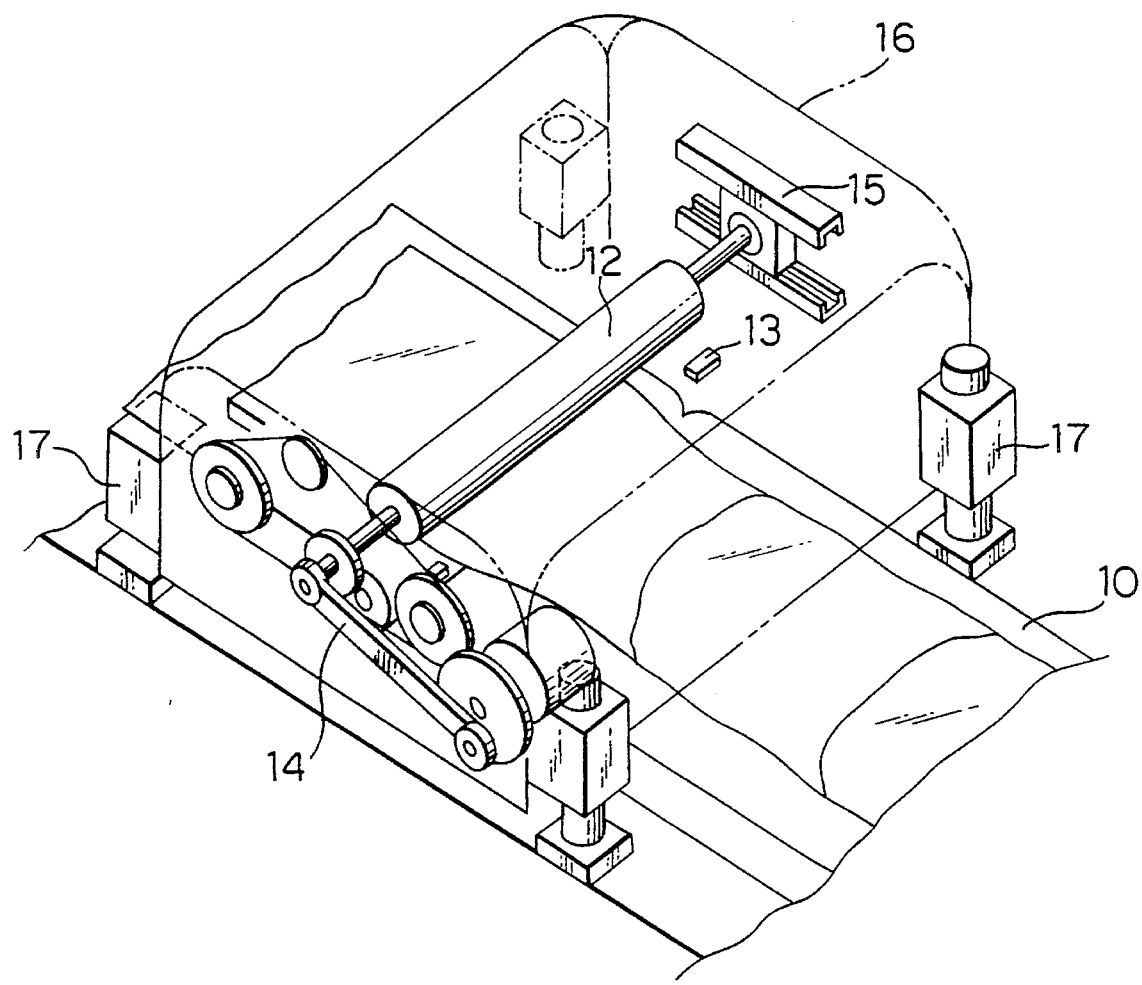
FIG. 2 is an enlarged perspective view of a part of the apparatus of FIG. 1.

In FIG. 1 a hopper 1 holds a mass of dough 2 for bread or confectionery, which is still under fermentation. The hopper has a bottom opening 3 from which the dough 2 hangs. Under the opening 3 a cutter 4 is disposed to successively cut blocks of dough 5 from the mass. The weights of the blocks may differ from each other. A known scaling conveyor 6 which consists of a conveyor belt wound around a scaling table 7 to receive the blocks of dough and to measure their weights is disposed under the cutter 4. A first conveyor, i.e., a supply conveyor 8, is arranged below the scaling conveyor 6. The first conveyor is comprised of two conveyors, i.e., a primary supply conveyor 9 and a secondary supply conveyor 10.

The scaling conveyor 6 is movable upstream and downstream as shown by a double-ended arrow, and discharges the individual dough blocks onto the primary supply conveyor 9 of the first conveyor 8. A second conveyor, i.e., a delivery conveyor 11, is arranged downstream of the secondary supply conveyor 10. The secondary supply convey 10 is inclined so as to connect the delivery conveyor 11 and the primary supply conveyor 9, which are at different levels. Although in the example shown in the drawings the first conveyor is divided into two conveyors, it may be designed as in a single one as taught by above-mentioned U.S. patents. A stretching roller 12 is disposed to reciprocate over a distance stretching above the first and second conveyors 8, 11, thereby defining a space or gap between it and the conveyors 8, 11. The roller 12 is operated by a known mechanism 14 as taught by the above U.S. patents so that it can reciprocatingly move between the upstream part of the second conveyor 11 and the downstream part of the secondary supply conveyor 10, along guide rails 15. The roller 12, mechanism 14, and rails 15, are mounted on a cover-shaped frame 16. The frame 16 is movably mounted on four actuators 17 secured to the floor. The actuators raise or lower the roller to adjust the gap between it and the conveyors 10, 11.

A known width-sensor 13 is disposed near the roller so as to detect the width of the dough sheet stretched by the roller.

The first conveyor 8 is driven by a servomotor 18 so that its speed can be changed when desired. A rotary encoder 19 is electrically coupled to the conveyor 8 to detect its speed. The apparatus is provided with a computer 20 having a memory and a controller. The computer 20 is operatively coupled to the cutter 4, scaling conveyor 6, servomotor 18, and encoder 19.

In the arrangements of the apparatus, at first the first and second conveyors 8, 11 are running at their respective speeds. The controller 20 initiates the operation of the cutter 4 and the scaling conveyor 6. The cutter moves inwards and cuts a block of dough 5 from the mass 2 of dough under fermentation. The opening 3 of the hopper 1 is closed by the blades of the cutter. The block 5 drops onto the scaling table 7 of the scaling conveyor 6. The scaling conveyor 6 is stationary when the block 5 drops, and the weight of the block is measured by the scaling table. The information on the weight is transmitted to the computer 20. The scaling conveyor 6 then starts to rim counterclockwise as shown by a curved arrow in FIG. 1 while it starts moving upstream (i.e., to the right in FIG. 1) so that the block of dough 5 is placed on the first conveyor 8 in an almost sheet-like shape. After the first conveyor 8 has transferred the dough block downstream in a time that is proportional to the weight of the dough block so that the distance between the leading and trailing ends of the dough block is proportional to the weight of the dough block, the controller 20 actuates the scale conveyor to pass a second block of dough to the first conveyor 8. In the same manner, a number of blocks of dough are arranged on the supply conveyor 8 while leading ends of the blocks are spaced apart by distances proportional to their weights. Preferably, the blocks are placed on the conveyor 8 in such a manner that there is no space between them or so that they overlap to form a continuous sheet-like dough body.

The continuous dough body enters the gap under the roller 12, and is stretched by the reciprocating action of the roller. The width D of the stretched dough sheet is measured by the sensor 13. The same as for the apparatus of U.S. Pat. No. 5,118,274, the speed of the second conveyor 11 is constant and the speed of the first conveyor 8 varies relative to that of the second conveyor such that the feeding amount (volume) of dough by the first conveyor equals the amount (volume) of dough discharged by the second conveyor. If no measurement is made the volume of the dough at the roller 12 may increase due to fermentation during the transfer on the first conveyor. If this happens, the width of the dough stretched by the roller 12 becomes wider than the desired width. The sensor 13 transmits the data on this state to the computer 20, and it controls the servomotor 19 to reduce the speed of the first conveyor to make the width of the dough a desired one. As a result, the productivity of the dough product, i.e., the delivery rate of the weight of dough per unit time, is reduced. To bring back the productivity to the prior level, the frame 16 carrying the roller 12 may be raised by operating the actuators 17. By this operation the gap under the roller is enlarged, and a constant amount (weight) discharged of the dough per unit time can be maintained.

How the variation in the specific gravity of the dough due to fermentation is detected will now be explained.

For each individual dough block cut from the mass in the hopper a predetermined theoretical traveling distance is set. This theoretical traveling distance for a dough block is defined as a value of the weight D of the block divided by a predetermined width W and height H and the specific gravity ρ of the dough block.

The predetermined theoretical traveling length $L_T$ is expressed by $L_T = D/(WH\rho)$.

When an amount of dough to be produced is set as A kg/h, and if the speed of the first conveyor is V cm/h, the following equation can be obtained:

$$WHV = A/\rho$$

An actual traveling length $L_A$ is determined by the computer 20 using the information from the rotary encoder 19, i.e., the number of pulses from the encoder, and the necessary information, such as the values of the weights of dough blocks, etc., is stored in the memory of the computer. If the theoretical time necessary to transfer on the first conveyor the dough block for which the theoretical length is $L_T$ is set at $T_S$, then $T_S = L_T/V = D/A$.

Accordingly, the desired gap size G is expressed as $G = (T_P/T_S) \times G_1$, where $T_P$ is an actual time required to have transferred the dough block on the first conveyor, and $G_1$ is a present gap size. The actual time to transfer the dough block is obtained from the information from the rotary encoder.

The rate of change of the specific gravity for the dough is obtained from the ratio of the actual traveling length to the theoretical traveling length of the dough. By knowing the rate of change of the specific gravity of the dough, the fermentation rate is known.

What we claim is:

1. A method for delivering a constant amount of dough per unit time, including the steps of successively dividing a mass of dough under fermentation into dough blocks of non-constant volumes, measuring the weights of the blocks, passing the blocks to a supply conveyor provided with means for measuring the traveling distance thereof, the blocks being laid on the supply conveyor with a spacing proportional to the weights thereof, stretching the dough of the blocks by causing the dough to pass though a predetermined gap thereby making the dough a constant thickness, passing the dough to a delivery conveyor while adjusting the speed of the supply conveyor based on the variation of the width of the dough when the dough is stretched, wherein the rate of change of the specific gravity of the dough is determined by comparing a theoretical traveling distance of the dough and an actual traveling distance of the dough per unit of time.

2. A method for delivering a constant amount of dough per unit time, including the steps of successively dividing a mass of dough under fermentation into dough blocks of non-constant volumes, measuring the weights of the blocks, passing the blocks to a supply conveyor provided with means for measuring the traveling distance thereof, the blocks being laid on the supply conveyor with a spacing proportional to the weights thereof, stretching the dough of the blocks by causing the dough to pass through a predetermined gap thereby making the dough a constant thickness, passing the dough to a delivery conveyor while adjusting the speed of the supply conveyor based on the variation of the width of the dough when the dough is stretched, wherein the gap is adjusted based upon comparing a theoretical traveling distance of the dough and an actual traveling distance of the dough per unit time.

3. An apparatus for delivering a constant amount of dough per unit time, comprising:

means for supplying dough which is still under fermentation;

scaling means for receiving successive dough blocks of non-constant volumes from the dough supplying means, measuring the weights of the blocks, and discharging the blocks downwards;

a first conveyor for receiving the blocks from the scaling means;

a second conveyor disposed downstream of the first conveyor for receiving the dough blocks from the first conveyor;

a stretching roller disposed above the upstream end part of the second conveyor and the downstream end part of the first conveyor, the roller being spaced apart from the first and second conveyors and movable reciprocally over the end parts of the first and second conveyors;

a width-sensor disposed near the roller for detecting the width of the dough stretched by the roller;

means for controlling the speed of the first conveyor in association with the width-sensor, the controlling means being adapted to measure the traveling distance of the first conveyor for transferring each dough block, to cooperate with the scaling means and the first conveyor so that the dough blocks can be transferred at distances proportional to the weights thereof, and to determine the ratio of a theoretical traveling distance to an actual traveling distance per unit time for each dough block.

4. The apparatus of claim 3, further comprising means for moving the roller for adjusting the gap formed between the roller and the conveyors.

\* \* \* \* \*